United States Patent [19]
Scherer

[11] 3,982,772
[45] Sept. 28, 1976

[54] APPARATUS FOR TURNING COMPOST SILO

[75] Inventor: Werner Scherer, Gottmadingen, Germany

[73] Assignee: Maschinenfabrik Fahr Aktiengesellschaft, Gottmadingen, Germany

[22] Filed: Sept. 22, 1975

[21] Appl. No.: 615,724

[52] U.S. Cl. .............................. 280/462; 56/370;
56/DIG. 14; 180/14 R; 180/53 D; 280/467;
280/472
[51] Int. Cl.² .......................................... B60D 1/14
[58] Field of Search .............. 180/14 R, 53 C, 53 D,
180/53 R; 280/472, 467, 468, 462, 463;
56/370, DIG. 14, 10.6, 16.4, 218

[56] References Cited
UNITED STATES PATENTS

| | | | |
|---|---|---|---|
| 1,646,455 | 10/1927 | Johnson | 180/14 R |
| 2,636,335 | 4/1953 | Whitney | 56/370 |
| 2,725,704 | 12/1955 | Skromme | 56/16.4 |
| 3,014,737 | 12/1961 | Claas | 280/462 |
| 3,427,790 | 2/1969 | Flittie | 56/16.4 X |
| 3,884,022 | 5/1975 | Landolt | 56/370 X |

FOREIGN PATENTS OR APPLICATIONS

| | | | |
|---|---|---|---|
| 392,166 | 3/1924 | Germany | 280/472 |
| 1,905,005 | 2/1970 | Germany | 56/370 |

*Primary Examiner*—M. H. Wood, Jr.
*Assistant Examiner*—John P. Silverstrim
*Attorney, Agent, or Firm*—Karl F. Ross; Herbert Dubno

[57] ABSTRACT

An apparatus for turning a compost silo has a portal frame adapted to travel along the ground in a travel direction and a pair of side portions spaced sufficiently apart transverse to the direction to straddle the silo. A pair of oppositely handed augers extending transverse to the travel direction between the side portions are rotatable to turn the silo. At each end this double auger is connected to the output of a respective angle drive having an input directed forwardly and connectable via a rod to the power takeoff of a tractor in front of and to one side of the frame relative to the travel direction. A tow bar has a rear end pivoted on the frame midway between the side portions and a front end connectable to the hitch of the tractor. Thus, this apparatus may follow the tractor to either side of the tractor.

10 Claims, 5 Drawing Figures

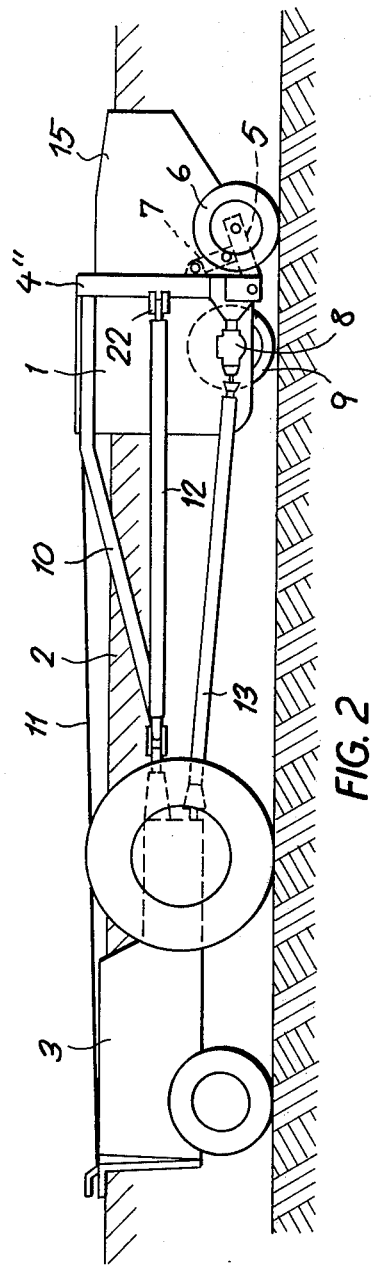
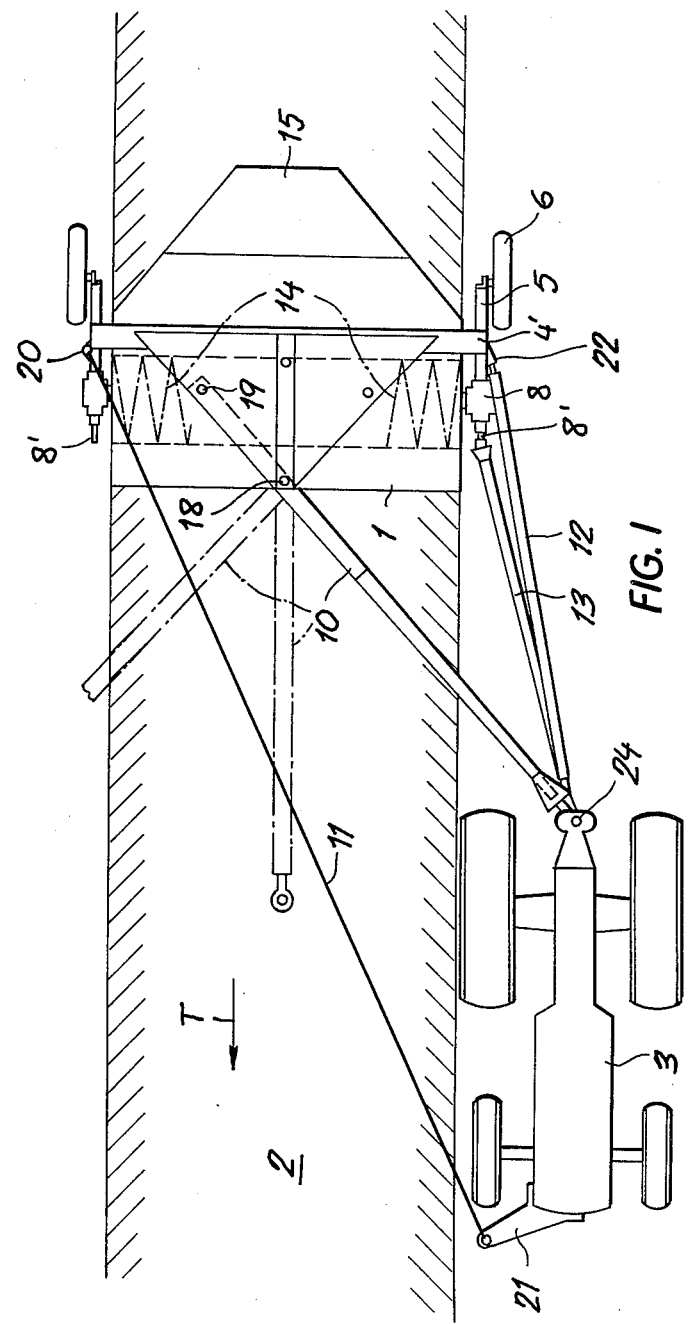

APPARATUS FOR TURNING COMPOST SILO

FIELD OF THE INVENTION

The present invention relates to an apparatus for turning a compost silo.

BACKGROUND OF THE INVENTION

An apparatus is known for working a garbage heap. This apparatus comprises a self-propelled portal frame having a pair of side portions spaced apart transverse to the normal direction of travel of the device. A turning roller or cylinder extending transverse to this direction is suspended on the frame between the side portions. The side portions ride on rails set into the ground. This device is driven along on elongated heap of garbage or the like and serves to turn it. See German published specification No. 1,905,005.

Such an arrangement is completely unsuitable for use in turning a silo. Mainly the device is extremely expensive so that its periodic use, as a silo need only be turned from time to time, cannot justify the considerable expense. Even in very big operations such a device is economically unjustifiable.

OBJECTS OF THE INVENTION

It is therefore an object of the present invention to provide an apparatus for turning a silo.

Another object is the provision of such a device which is relatively inexpensive so that it can be afforded even by small operations.

SUMMARY OF THE INVENTION

These objects are attained according to the present invention in an apparatus for turning a compost heap or silo and comprising a portal frame of the above-described general type carrying a turning element extending transversely between its side portions. Drive means for rotating this turning element includes an angle drive on each of the side portions having an output connected to the element and a forwardly directed input. A towing bar has a rear end pivoted on the portal frame midway between the side portions and a front end connectable to the hitch of a tractor in front of and to either side of the frame relative to the direction of travel. A connecting member has a front end couplable to the power takeoff of the tractor and a rear end couplable with the input of the angle drive on the same side of the frame as the tractor.

Thus, in accordance with this invention the turning apparatus may be pulled behind a conventional tractor and driven from the power takeoff of this tractor. Such an arrangement need not have its own expensive drive engine, so that its cost is relatively low. Being able to pull the apparatus by means of a tractor in front of and to either side of the arrangement allows the silos to be placed relatively close to one another so that minimal field space is wasted.

According to further features of this invention the apparatus is provided with a guide that forms the silo into a triangular-section heap having a broad base. This guide is made of sheet metal and extends backwardly from the portal frame.

In accordance with yet another feature of this invention each of the side portions of the portal frame rides on the ground by means of a tire which can be displaced between a first position in which the turning element is relatively close to the ground and a second position in which this element is spaced well above the ground. This second position is used for transporting the apparatus to and from the field, in which case the tow bar is swiveled into a central position so that the device travels directly behind the tractor. This swiveling of the wheels of the apparatus is effected by means of respective hydraulic cylinders carried on the side portions of the frames.

According to yet another feature of this invention stabilizing means is provided in the form of a cable extending between the front end of the tractor and that side portion of the portal frame furthest from the tractor. In addition a rigid bar extending between the rear of the tractor and that side portion of the frame closest to the tractor is also provided so as to ensure that the apparatus follows the tractor to one side, outrigger fashion, at all times.

The turning element according to this invention is formed as a pair of in-line and oppositely handed augers rotated in such a direction that the auger blades move the silo compost inwardly. This turning element is rotated at a speed of between 200 and 300 rpm.

BRIEF DESCRIPTION OF THE DRAWING

The above and other objects, features, and advantages will become more readily apparent from the following, reference being made to the accompanying drawing in which:

FIGS. 1, 2 and 3 are top, side and rear views of the apparatus according to this invention.

SPECIFIC DESCRIPTION

Figure 3:
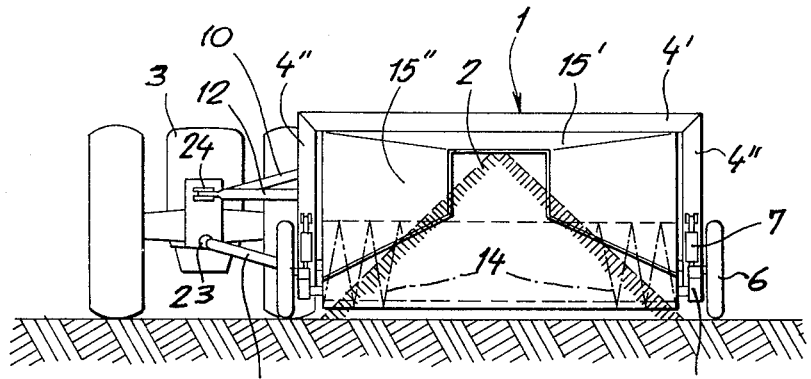

As shown in FIGS. 1 – 3 a compost silo 2 is turned by means of an apparatus 1 which is pulled by a conventional farm tractor 3. The apparatus 1 basically comprises a portal frame having a horizontal traverse 4' extending perpendicular to the direction of normal travel T of the arrangement and a pair of upright side portions 4''. Each of the side portions 4'' carries a respective wheel 6 rotatable in a plane parallel to the direction T and carried on an arm 5 swivelable about a horizontal axis in the respective plane parallel to the plane of the wheel by means of a respective hydraulic cylinder 7. Pressurization of the cylinders 7 lifts the apparatus 1 well clear of the ground to allow it to be towed to the field where it is to be used.

Journaled in the two side portions 4'' is a turning element 9 formed of a pair of oppositely handed augers 14 whose blades when rotated in a predetermined direction can turn and displace the heap 2 inwardly toward the center of the arrangement. Each end of this element 9 is connected to the lateral output of a right-angle drive 8 carried on the respective side portion 4''. The inputs 8' of these right-angled drives 8 are connected to the rear ends of connecting rods 13 whose front ends are connected to the power takeof 16 of the tractor 3. The element 9 can be driven through either transmission 8 at a speed of 250 rpm.

A tow bar 10 has a front end connected to the hitch 24 on the back of the tractor 3 and a rear end pivotal about a vertical pintel 18 in the middle of the traverse 4'. This tow bar 10 may be displaced from a central position shown in dot-dash lines in FIG. 1 parallel to the direction T into two lateral positions. A pin 19 may be passed through the traverse 4' and through a coresponding hole in the extreme rear end of the bar 10 in any of these three positions so as to lock this bar 10 in the desired position.

In addition the traverse 4' is provided on its opposite sides with eyes 20 to which a cable 11 connected at its front end to an outrigger 21 on the front of the tractor 5 may be attached. A rigid bar 12 is also connectable between the hitch 24 and a pair of eyes 22 on either of these uprights 4'. In this manner the apparatus 1 is made to follow exactly behind and to one side of the tractor 3. Most of the towing force is taken up by the bar 10, with the cable 11 and the bar 12 merely serving to hold the apparatus 1 to the side.

Extending backwardly from each of the side portions 4" is a sheet-metal plate 15", with another portion of the plate 15' extending backwardly from the traverse 4'. These plates 15' and 15" form a backwardly tapering guide that serves to shape the pile of compost silo thrown back by the augers 14. Thus the silo 2 is formed into an elongated pile of triangular section, the triangle being a right isosceles triangle with a narrow bore.

Figure 4:
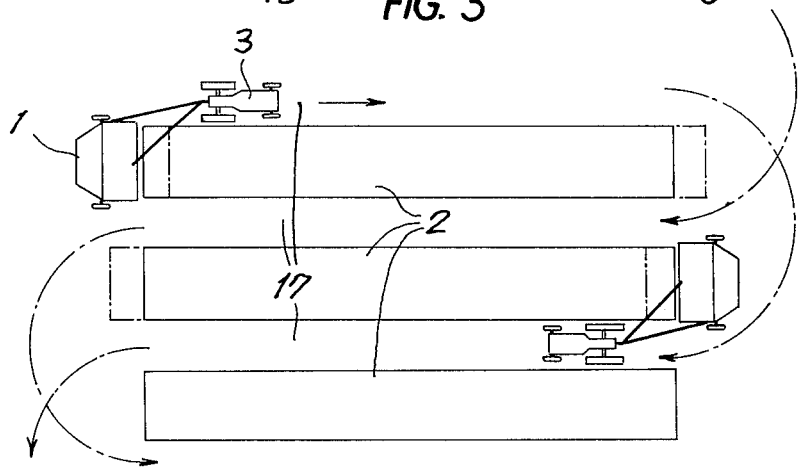
FIGS. 4 and 5 are top views of silo layouts.
Figure 5:
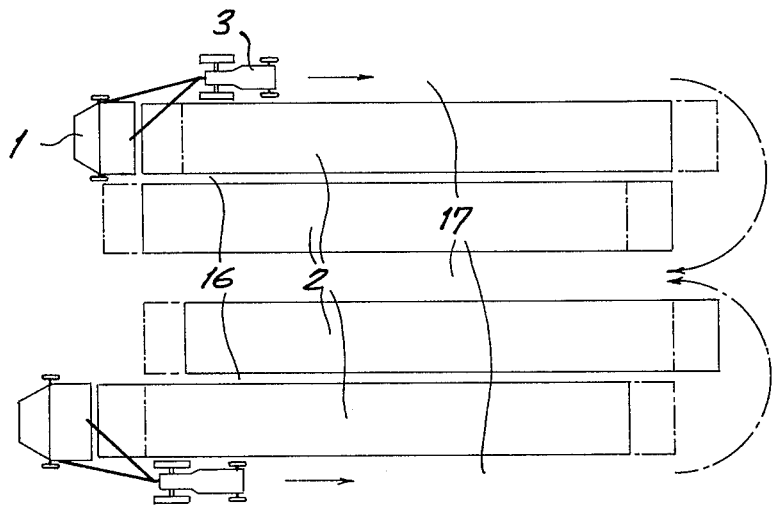

Such an arrangement may be mounted to one side of the tractor 3 as illustrated in FIG. 4, and merely pulled along next to a plurality of such piles 2, with the tractor 3 passing in tractor-width lanes 17 between adjacent piles 2. In accordance with the present invention it is also possible as shown in FIG. 4 to provide tractor-width lanes 17 only between every two piles 2, with very narrow lanes 16 between adjacent paired piles. Thus the tractor 3 will more the apparatus 1 along one pile of each pair, then along the other pile of the same pair, then it may be moved to the other side of the tractor 3 and another pair of rows turned. Such an arrangement allows much more efficient use of the field, with 20 to 30% more silage being storable. The dot-dash lines at the ends of the piles in FIG. 2 illustrate the sections 1 m — 2 m long by which the piles 2 are displaced longitudinally each time they are turned.

I claim:

1. An apparatus for turning a compost silo, said apparatus comprising:

a portal frame adapted to travel along the ground in a predetermined direction and having a pair of side portions spaced sufficiently apart transversely to said direction to straddle said silo, a turning element extending transversely between said side portions, drive means for rotating said element and including an angle drive on each of said side portions having an output connected to said element and a forwardly directed input, a tow bar having a rear end pivoted on said frame midway between said side portions and a front end connectable to the hitch of a tractor in front of and to either side of said frame relative to said direction, and a connecting member having a front end couplable to the power takeof of said tractor and a rear end couplable to the input of the angle drive on the same side of said frame as said tractor.

2. The apparatus defined in claim 1, further comprising a guide on said frame extending backwardly therefrom relative to said direction and shaped to form said silo into a generally triangular-section pile.

3. The apparatus defined in claim 1 wherein each of said side portions is provided with a respective wheel engaging the ground.

4. The apparatus defined in claim 3 wherein said frame is provided on each of said side portions with means for displacing said wheel vertically between a lower position and an upper position.

5. The apparatus defined in claim 4 wherein said means for displacing includes an arm pivoted on the respective side portion and carrying at its end the respective wheel, and a hydraulic cylinder connected between each of said side portions and the respective arm.

6. The apparatus defined in claim 1, further comprising a flexible element having a front end connected to said tractor and a rear end connected to the side portion of said frame on the side opposite said tractor.

7. The apparatus defined in claim 1, further comprising a rigid bar having a front end connected to said tractor and a rear end connected to the side portion of said frame on the same side as said tractor.

8. The apparatus defined in claim 1, wherein said turning element is a pair of oppositely handed in-line augers suspended between said side portions.

9. The apparatus defined in claim 8, wherein said drive means rotates said element at a speed between 200 rpm and 300 rpm.

10. The apparatus defined in claim 1, further comprising means for locking said tow bar in two positions each extending forwardly to a respective side of said frame.

\* \* \* \* \*